US009375895B2

(12) United States Patent
Paschkowski et al.

(10) Patent No.: US 9,375,895 B2
(45) Date of Patent: Jun. 28, 2016

(54) HOTMELT ADHESIVES HAVING AN EXTENDED OPEN TIME

(75) Inventors: Kai Paschkowski, Jork (DE); Mathias Cordes, Hamburg (DE)

(73) Assignee: SIKA TECHNOLOGY AG, Baar (CH)

( * ) Notice: Subject to any disclaimer, the term of this patent is extended or adjusted under 35 U.S.C. 154(b) by 520 days.

(21) Appl. No.: 12/921,498

(22) PCT Filed: Apr. 28, 2009

(86) PCT No.: PCT/EP2009/055110
§ 371 (c)(1),
(2), (4) Date: Sep. 29, 2010

(87) PCT Pub. No.: WO2009/133093
PCT Pub. Date: Nov. 5, 2009

(65) Prior Publication Data
US 2011/0020634 A1 Jan. 27, 2011

(30) Foreign Application Priority Data
Apr. 28, 2008 (EP) .................................... 08155272

(51) Int. Cl.
B32B 7/12 (2006.01)
C09J 151/06 (2006.01)
(Continued)

(52) U.S. Cl.
CPC ... *B32B 7/12* (2013.01); *B32B 5/02* (2013.01); *B32B 5/18* (2013.01); *B32B 15/08* (2013.01); *B32B 21/08* (2013.01); *B32B 27/065* (2013.01); *B32B 27/08* (2013.01); *B32B 27/12* (2013.01); *B32B 27/16* (2013.01); *B32B 27/18* (2013.01); *B32B 27/20* (2013.01); *B32B 27/28* (2013.01); *B32B 27/285* (2013.01); *B32B 27/302* (2013.01); *B32B 27/306* (2013.01); *B32B 27/308* (2013.01); *B32B 27/32* (2013.01); *B32B 27/327* (2013.01); *B32B 27/36* (2013.01); *B32B 27/40* (2013.01); *C09J 151/06* (2013.01);
(Continued)

(58) Field of Classification Search
None
See application file for complete search history.

(56) References Cited

U.S. PATENT DOCUMENTS 4,680,330 A * 7/1987 Berrier et al. ................. 524/230
5,241,014 A 8/1993 Kehr et al.
(Continued)

FOREIGN PATENT DOCUMENTS

CA 2214334 3/1998
DE 40 00 695 7/1991
(Continued)

OTHER PUBLICATIONS

Vestoplast 750 datasheet from Evonik Industries (2011), available at http://coatings.panpage.de/En/Resins/VESTOPLAST/VESTOPLAST)750_e.pdf (accessed Nov. 5, 2012).*
(Continued)

*Primary Examiner* — Scott R Walshon
(74) *Attorney, Agent, or Firm* — Oliff PLC

(57) ABSTRACT

The present invention relates to hotmelt adhesive compositions which comprise at least one thermoplastic, silane-grafted poly-α-olefin which is solid at 25° C. and at least one soft resin having a melting point or softening point between −10° C. and 40° C. These hotmelt adhesive compositions are suitable in particular as laminating adhesives and, even in thin layers, have an extended open time but nevertheless build up a high early strength rapidly and lead to a heat-stable adhesive bond.

16 Claims, 1 Drawing Sheet

(51) Int. Cl.
*B32B 5/02* (2006.01)
*B32B 5/18* (2006.01)
*B32B 15/08* (2006.01)
*B32B 21/08* (2006.01)
*B32B 27/06* (2006.01)
*B32B 27/08* (2006.01)
*B32B 27/12* (2006.01)
*B32B 27/16* (2006.01)
*B32B 27/18* (2006.01)
*B32B 27/20* (2006.01)
*B32B 27/28* (2006.01)
*B32B 27/30* (2006.01)
*B32B 27/32* (2006.01)
*B32B 27/36* (2006.01)
*B32B 27/40* (2006.01)

(52) U.S. Cl.
CPC ......... *B32B 2262/06* (2013.01); *B32B 2262/08* (2013.01); *B32B 2270/00* (2013.01); *B32B 2307/30* (2013.01); *B32B 2307/308* (2013.01); *B32B 2307/50* (2013.01); *B32B 2405/00* (2013.01); *B32B 2479/00* (2013.01); *B32B 2605/00* (2013.01); *B32B 2605/003* (2013.01); *C09J 2201/61* (2013.01); *C09J 2423/00* (2013.01); *C09J 2451/00* (2013.01); *Y10T 428/249921* (2015.04); *Y10T 428/249985* (2015.04); *Y10T 428/31663* (2015.04)

(56) References Cited

U.S. PATENT DOCUMENTS

| | | | |
|---|---|---|---|
| 5,331,049 A * | 7/1994 | Audett et al. | 525/100 |
| 5,994,474 A | 11/1999 | Wey et al. | |
| 6,042,930 A * | 3/2000 | Kelch et al. | 428/195.1 |
| 6,872,279 B1 * | 3/2005 | Kolowrot et al. | 156/334 |
| 2004/0220320 A1 * | 11/2004 | Abhari et al. | 524/487 |
| 2005/0043455 A1 | 2/2005 | Hohner | |
| 2005/0059759 A1 * | 3/2005 | Sajot et al. | 524/271 |
| 2008/0167421 A1 * | 7/2008 | Yalvac et al. | 524/570 |

FOREIGN PATENT DOCUMENTS

| | | |
|---|---|---|
| EP | 0 827 994 A2 | 3/1998 |
| JP | A-10-088096 | 4/1998 |
| JP | A-2005-068423 | 3/2005 |
| WO | WO 89/11512 A1 | 11/1989 |
| WO | WO 8911513 A1 * | 11/1989 ............ C08F 287/00 |
| WO | WO 91/06580 A1 | 5/1991 |
| WO | WO 2007008765 A2 * | 1/2007 |

OTHER PUBLICATIONS

International Preliminary Report on Patentability for International Patent Application No. PCT/EP2009/055110, mailed on Nov. 9, 2010.
International Search Report in International Application No. PCT/EP2009/055110, dated Aug. 26, 2009 (with English translation).
Jul. 2, 2013 Notice of Reasons for Refusal issued in Japanese Application No. 2011-506684 with English-language translation.
Vestoplast® 750, Evonik Industries, Product Catalog 34.13.083e, Jul. 11, 2014.
Aug. 20, 2015 Korean Office Action issued in Korean Application No. 10-2010-7026633.
Oct. 5, 2015 European Office Action issued in European Application No. 09 738 137.0.
Oct. 27, 2015 Indian Office Action issued in Indian Application No. 3313/KOLNP/2010.

* cited by examiner

HOTMELT ADHESIVES HAVING AN EXTENDED OPEN TIME

FIELD OF THE INVENTION

The invention relates to the field of hotmelt adhesives, in particular of laminating adhesives.

PRIOR ART

Hotmelt adhesives have long been known and are used as laminating adhesives. If the molten adhesive is applied in a thin layer there is however the major problem that these adhesives have a short open time, i.e. that the adhesive cools rapidly in thin layers and solidifies thereby so that the adhesive no longer wets the surface of the parts to be joined and hence no adhesive bond can form. This is the case in particular with hotmelt adhesives which are based on amorphous thermoplastics. A further disadvantage of this type of hotmelt adhesives is the problem that the adhesives are thermoplastic even after application. The result of this is that the adhesive in an adhesive bond melts again on heating the adhesive bond, with the result that the bond is destroyed under load.

Polyurethane hotmelt adhesives are reactive hotmelt adhesives and are preferred because they react with moisture and crosslink after application and thus make it possible to realize very heat-stable adhesive bonds. However, these adhesives are extremely soft immediately after application and build up their strength only in the course of time, i.e. when they crosslink. Reactive polyurethane hotmelt adhesives thus have a long open time in thin layers but have the major problem of a low initial strength.

Hotmelt adhesives based on silane-grafted poly-α-olefins are known to the person skilled in the art, for example from U.S. Pat. No. 5,991,747 U.S. Pat. No. 5,994,474 and DE 40 00 695 A1 These adhesives have very interesting properties since firstly these hotmelt adhesives are likewise reactive hotmelt adhesives, with the result that high strength and great heat stability can be achieved. Secondly, the initial strength is also very high. However, these adhesives, too, have a very short open time in thin layers, which to date has been detrimental to their use as laminating adhesives without prior reactivation (remelting).

SUMMARY OF THE INVENTION

The object of the present invention is therefore to provide hotmelt adhesives which have an extended open time even in thin layers but nevertheless rapidly build up a high early strength and lead to a heat-stable adhesive bond.

Surprisingly, it has been found that a hotmelt adhesive composition as disclosed herein is capable of solving this problem. The hotmelt adhesive compositions have a broad adhesion spectrum and lead to adhesive bonds which have a high load capacity and are extremely heat-stable. Moreover, a greatly reduced creep behaviour was found in the case of adhesive bonds which are produced with such hotmelt adhesive compositions. The hotmelt adhesive compositions are very advantageous from occupational hygiene and work safety points of view.

Further aspects of the present invention are a use of the hotmelt adhesive composition for the adhesive bonding of polyolefin films, foams or textiles, a composite body, and a process for the production of the composite body.

Preferred embodiments of the invention form the subject of the subclaims.

DESCRIPTION OF THE PREFERRED EMBODIMENTS

Figure 1:
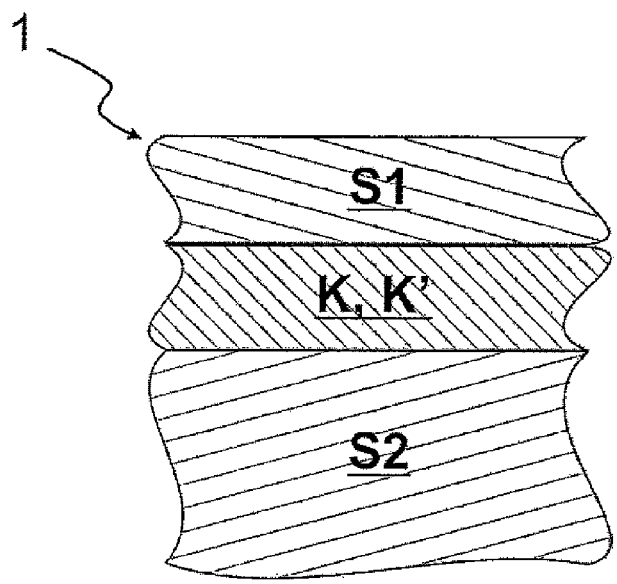
FIG. 1 is a schematic drawing of a composite body that comprises a hotmelt adhesive composition arranged between first and second substrates.

In a first aspect, the present invention relates to a hotmelt adhesive composition which comprises
a) at least one thermoplastic, silane-grafted poly-α-olefin (P) which is solid at 25° C.; and
b) at least one soft resin (WH) having a melting point or softening point between −10° C. and 40° C.

The hotmelt adhesive composition contains a thermoplastic, silane-grafted poly-α-olefin (P) which is solid at 25° C.

"α-olefin" in the present document is understood as meaning according to the usual definition to be an alkene of the sum formula $C_xH_{2x}$ (x being the number of carbon atoms) which has an C—C-double bond at the first carbon atom (α-carbon). Examples for such α-olefins are ethylene, propylene, 1-butene, 1-pentene, 1-hexene, 1-heptene and 1-octene, Therefore, for example neither 1,3-butadiene nor 2-butene nor styrene are α-olefins in the sense of this document.

"poly-α-olefin" in the present document is understood as meaning according to the usual definition homopolymers from α-olefins and co-polymers from different α-olefins.

Preferably, the silane-grafted poly-α-olefin (P) has a softening temperature between 70° C. and 150° C., in particular between 80° C. and 120° C., preferably between 90° C. and 110° C.

Here, the softening point is measured by the ring-and-ball method, for example based on DIN EN 1238.

Such silane-grafted poly-α-olefins (P) are very well known to the person skilled in the art. They can be obtained, for example, by grafting unsaturated silane, such as vinyltrimethoxysilane, onto a poly-α-olefin. A detailed description of the preparation of such silane-grafted poly-α-olefins is disclosed, for example, in U.S. Pat. No. 5,994,474 and DE 40 00 695 A1, the content of which is herewith incorporated into the present application.

A particularly suitable silane-grafted poly-α-olefin (P) is a silane-grafted polyethylene or polypropylene.

Furthermore preferred as silane-grafted poly-α-olefins (P) are silane-grafted poly-α-olefins which are poly-α-olefins which were prepared by means of metallocene catalysts and onto which silane groups were grafted. These are in particular silane-grafted polypropylene homopolymers or polyethylene homopolymers.

The degree of grafting of the silane-grafted poly-α-olefin (P) is advantageously more than 1% by weight, in particular more than 3% by weight, of silane, based on the weight of the poly-α-olefin. Preferably, this degree of grafting is between 2 and 15% by weight, preferably between 4 and 15% by weight, most preferably between 8 and 12% by weight. If poly-α-olefins prepared via metallocene catalysts are used for the silane-grafted poly-α-olefins, the degree of grafting is preferably between 8 and 12% by weight.

It is particularly advantageous if the hotmelt adhesive composition comprises at least two different silane-grafted poly-α-olefins (P).

The proportion of all silane-grafted poly-α-olefins (P) is typically more than 50% by weight, preferably between 60 and 90% by weight.

It has been found that it is advantageous if the hotmelt adhesive composition furthermore contains a thermoplastic poly-α-olefin (P') which is solid at room temperature, in particular an atactic poly-α-olefin (APAO).

These atactic poly-α-olefins can be prepared by polymerization of α-olefins, in particular of ethene, propene, 1-butene, for example using Ziegler catalysts. It is possible to prepare homopolymers or copolymers of α-olefins. They have an amorphous structure compared with other polyolefins. The solid thermoplastic atactic poly-α-olefins (P') preferably have a softening point of more than 90° C., in particular between 90° C. and 130° C. The molecular weight $M_n$ is in particular between 7000 and 25 000 g/mol. It may be advantageous if metallocene catalysts are used for the preparation of the atactic poly-α-olefins (P').

Particularly preferably, the weight ratio of solid silane-grafted poly-α-olefin (P) to solid thermoplastic poly-α-olefin (P') is between 1:1 and 20:1. A proportion of solid thermoplastic poly-α-olefin (P') of 5 to 40% by weight, preferably 15 to 35% by weight, based on the hotmelt adhesive composition, has been found to be particularly suitable.

The hotmelt adhesive composition furthermore contains at least one soft resin (WH) having a melting point or softening point between −10° C. and 40° C. Owing to the fact that the soft resin (WH) is very close to the melting point or softening point at room temperature (23° C.), it is either already liquid or very soft at room temperature. A soft resin may be a natural resin or synthetic resin.

In particular, such soft resins (WH) are medium to relatively high molecular weight compounds from the classes consisting of the paraffin resins, hydrocarbon resins, polyolefins, polyesters, polyethers, polyacrylates or amino resins.

The soft resin (WH) preferably has a melting point or softening point between 0° C. and 25° C., in particular 10° C. and 25° C.

In a preferred embodiment, the soft resin (WH) is a hydrocarbon resin, in particular an aliphatic $C_5$-$C_9$-hydrocarbon resin.

An aliphatic $C_5$-hydrocarbon resin which is sold commercially under the trade name Wingtack® 10 by Cray Valley has been found to be particularly suitable as soft resin (WH).

Further suitable soft resins are, for example, polyterpene resins, as are sold commercially, for example, as Sylvares® TR A25 by Arizona Chemical, USA, rosin esters and tall resin esters, as are sold commercially, for example, as Sylvatac® RE 12, Sylvatac® RE 10, Sylvatac® RE 15, Sylvatac® RE 20, Sylvatac® RE 25 or Sylvatac® RE 40 by Arizona Chemical, USA.

Further suitable soft resins are, for example, Escorez™ 5040 (Exxon Mobil Chemical).

Other hydrocarbon resins suitable as soft resins are, for example, Picco A10 (Eastman Kodak) and Regalite R1010 (Eastman Kodak).

The proportion of all soft resins (WH) is typically 20-40% by weight, in particular 25 to 35% by weight, based on the hotmelt adhesive composition.

It has moreover been found that it is advantageous if the weight ratio of all soft resins (WH) to all silane-grafted poly-α-olefins (P) is less than 0.5. Preferably, this weight ratio is between 0.2 and 0.4 and most preferably between 0.3 and 0.4.

The hotmelt adhesive composition can, if required, additionally comprise further thermoplastic polymers. These are in particular thermoplastic polyesters (TPE), thermoplastic polyurethanes (TPU) and homo- or copolymers of at least one monomer which is selected from the group consisting of ethylene, propylene, butylene, isobutylene, isoprene, vinyl acetate, vinyl esters of higher carboxylic acids and esters of (meth)acrylic acid. Ethylene-vinyl acetate copolymers (EVA) are particularly suitable as such an additional thermoplastic polymer. Of course, these thermoplastic polymers may also be grafted.

The hotmelt adhesive composition furthermore preferably contains at least one catalyst which catalyses the reaction of silane groups, in particular in an amount of 0.01-1.0% by weight, preferably of 0.01-0.5% by weight, based on the hotmelt adhesive composition. Such catalysts are in particular an organotin compound, preferably dibutyltin dilaurate (DBTL).

Furthermore, the hotmelt adhesive composition may comprise further constituents. Suitable further constituents are in particular constituents which are selected from the group consisting of plasticizers, adhesion promoters, UV absorbers, UV and heat stabilizers, optical brighteners, fungicides, pigments, dyes, fillers and drying agents.

However, it has been found that it is particularly advantageous if the total weight of all thermoplastic, silane-grafted poly-α-olefins (P) which are solid at 25° C. and all soft resins (WH) and all optionally present solid thermoplastic poly-α-olefins (P') is more than 80% by weight, preferably more than 90% by weight, of the hotmelt adhesive composition.

Hotmelt adhesive compositions which substantially comprise thermoplastic, silane-grafted poly-α-olefin (P) which is solid at 25° C., soft resin (WH), optionally solid thermoplastic poly-α-olefin (P') and catalyst which catalyses the reaction of silane groups have proved to be particularly advantageous.

Under the influence of water, in particular in the form of atmospheric humidity, the silane groups of the silane-grafted poly-α-olefin (P) hydrolyse to give silanol groups (—SiOH), which in turn react with one another and thus lead, with formation of siloxane groups (—Si—O—Si—) to crosslinking of the hotmelt adhesive composition. Such hotmelt adhesive compositions are designated as reactive hotmelt adhesives.

It is therefore advantageous to ensure that raw materials which are dried as thoroughly as possible are used for the preparation of the hotmelt adhesive composition and that the adhesives are protected as far as possible from contact with water or atmospheric humidity during the preparation, storage and application.

In principle, the preparation is effected in a customary manner known to the person skilled in the art for hotmelt adhesives.

The hotmelt adhesive compositions are liquefied by heating, by melting the thermoplastic ingredients. The viscosity of the hotmelt adhesive compositions should be adapted to the application temperature. Typically, the application temperature is 100 to 200° C. At this temperature, the adhesive is readily processable. In this temperature range, the viscosity is preferably 1500-50 000 mPas. If it is substantially higher, the application is very difficult. If it is substantially lower, the adhesive is of such a low viscosity that it runs off the material surface to be adhesively bonded during the application before it hardens as a result of cooling.

The solidification and hardening of the adhesive which take place due to the cooling result in a rapid build-up of strength and high initial adhesive strength of an adhesive bond. When using an adhesive, it should be ensured that the adhesive bonding takes place within the time in which the adhesive has not yet cooled too greatly, i.e. the adhesive bonding must take place while the adhesive is still liquid or at least still tacky and deformable. In addition to this physical method of hardening, the adhesive will also undergo further crosslinking after cooling owing to the influence of water, in particular of atmospheric humidity, and thus gain further mechanical strength within a short time of, typically, a few hours or days. In contrast to the unreactive hotmelt adhesive compositions, reactive hotmelt adhesive compositions cannot be reversibly heated and liquefied again thereby. Thus, the use of such adhesives is advantageous in particular for those applications where the adhesively bonded composite body comes into contact with high temperatures in the course of its use or life without the adhesive bond being damaged. Likewise, the use of such hotmelt adhesives is advantageous in that, owing to the crosslinking, such adhesives exhibit significantly less creep.

It has been found that, even in thin layers, the described hotmelt adhesive compositions according to the invention have an extended open time, i.e. an open time of typically several minutes, in particular of 3 to 10 minutes, during which joining to a part to be joined is possible. The adhesive is capable of thoroughly wetting the surfaces of the parts to be joined during the open time. Moreover, an early strength builds up rapidly and enables the resulting adhesive joint to transmit forces to a certain extent within a short time. In the present document, thin layers are understood as meaning adhesive layer thicknesses of less than 1 mm, typically of 0.05 to 0.5 mm, in particular about 0.1 mm. Because of the water-related crosslinking reaction, very high final strengths, which are typically 1 to 2 MPa, can finally be achieved.

The described hotmelt adhesive compositions according to the invention are particularly advantageous from the points of view of occupational hygiene and work safety, owing to the absence of isocyanates.

They moreover have an extremely broad adhesion spectrum. In particular, in many cases even nonpolar plastics, such as polyethylene or polypropylene, can be adhesively bonded without primer.

In particular, "reactivation" (remelting) of the adhesive, required in many cases in the prior art prior to joining to the surface of the part to be joined is no longer necessary owing to the extended open time. This leads to a greatly simplified adhesive bonding process, which of course additionally gives rise to a financial incentive to use the adhesive according to the invention.

It has moreover been found that the hotmelt adhesive compositions described have a very long shelf-life, possess good processing properties, in particular in the application temperature range of 100 to 200° C., and are viscosity-stable at these temperatures even over a relatively long time. The hardening takes place without odour, rapidly and, even in the case of applications in thick layers, without bubbles. The adhesive is distinguished by good adhesion and good stability to environmental influences.

It has thus been found that the hotmelt adhesive compositions described above can be optimally used for the adhesive bonding of polyolefin films or foams or textiles.

Particularly preferably, they are used as laminating adhesives for the adhesive bonding of polyolefin films or foams or textiles.

Furthermore, the hotmelt adhesive compositions are also very suitable for the adhesive bonding of sandwich panels.

A further aspect of the invention relates to a composite body which has a first substrate (S1), which is a polyolefin film or a foam or a textile, a hotmelt adhesive composition (K) described above or a hotmelt adhesive composition (K') crosslinked by the influence of water and described above, and a second substrate (S2).

Here, the hotmelt adhesive composition or the crosslinked hotmelt adhesive composition is arranged between first substrate (S1) and second substrate (S2).

FIG. 1 schematically shows such a composite body (1) which comprises a first substrate (S1) and a second substrate (S2) and a hotmelt adhesive composition (K), or a hotmelt adhesive composition (K') crosslinked by the influence of water, which is arranged between first and second substrate and thus adhesively bonds these two substrates to one another.

"Polyolefin film" is understood as meaning in particular flexible sheet-like polyolefins in a thickness of 0.05 millimeter to 5 millimeters, which can be rolled up. Thus, in addition to "films" in the strict sense of thicknesses less than 1 mm, sealing sheets, as are typically used for sealing tunnels, roofs or swimming baths, in a thickness of typically 1 to 3 mm, in special cases even in a thickness of up to not more than 5 mm, are also used. Such polyolefin films are usually produced by spreading, casting, calendaring or extrusion and are typically commercially available in rolls or are produced on site. They may have a single-ply or multi-ply structure. It is clear to the person skilled in the art that even polyolefin films can contain yet other additives and processing agents, such as fillers, UV stabilizers and heat stabilizers, plasticizers, lubricants, biocides, flameproofing agents, antioxidants, pigments, such as, for example, titanium dioxide or carbon black, and dyes. This means that even those films which do not comprise 100% of polyolefins are designated as polyolefin films.

The second substrate (S2), in many cases also designated as a carrier, may be of a different type and nature. The substrates can, for example, be composed of plastics, in particular polyolefins or ABS, metal, coated metal, of plastic, wood, wood-base materials or fibre materials. The substrate is preferably a solid, shaped body.

In particular, the second substrate (S2) is a fibre material, in particular a natural fibre material.

Furthermore, the second substrate (S2) is preferably a polypropylene.

If required, the surface of the second substrate (S2) may have been pretreated. In particular, such a pretreatment may be cleaning or application of a primer. Preferably, however, the application of primers is not necessary.

The composite body described is preferably an article of industrial manufacture, in particular an article for interior finishing, preferably a built-in part in a means of transport or an article of the furniture industry.

The use for the production of interior cladding parts of vehicles, in particular automobiles, is particularly important. Examples of such interior cladding parts are door side parts, control panels, back shelves, roof liners, sliding roofs, centre consoles, glove compartments, sun visors, pillars, door handles and arm grips, the floor, loading floor and boot assemblies and sleeping cabin walls and rear walls of delivery vans and lorries.

A further aspect of the present invention is also a process for the production of a composite material as has just been described. This process comprises the steps
(i) melting of a hotmelt adhesive composition described above
(ii) application of the molten hotmelt adhesive composition to a polyolefin film (S1)
(iii) heating of the polyolefin film
(iv) bringing of the second substrate (S2) into contact with the molten hotmelt adhesive composition.

In particular, a vacuum thermoforming process or pressure lamination is used for this purpose in the sealing process.

In the case of vacuum thermoforming processes, the polyolefin film (S1) (decoration comprising air-impermeable material) is typically clamped air-tight in a frame. A lower mould on which the carrier is placed is present underneath the film. Lower mould and carrier are drilled through or air-permeable. The device is further sealed air-tight underneath. When the air is sucked out of this apparatus, the decorative material moulds itself with an exact fit onto the carrier part under the atmospheric pressure exerted on its surface. The decorative material is heated prior to application of the vacuum or reduced pressure. Owing to the vacuum or reduced pressure to be generated, the decorative material is air-impermeable.

As a result of the heating of the polyolefin film (S1), the film becomes soft and can adapt to the geometry of the carrier without creases forming.

The polyolefin films used here are in many cases decorative films and have a surface structure. This surface structure on the plastics film can, for example, be embossed before, during or after the adhesive bonding.

It is particularly advantageous here that the adhesive can be applied directly to the polyolefin film and not to the carrier, as is the case, for example, with polyurethane dispersion adhesives.

Thus, the contacting step is effected in particular under a pressure, in particular between 0.1 bar and 1 bar, preferably at least 0.8 bar (corresponding to the application of a vacuum of up to 0.9 bar, preferably of at least 0.2 bar).

The pressure is preferably produced by application of reduced pressure in the space between second substrate (S2) and polyolefin film (S1). The above-mentioned pressure therefore comes into being in particular by application of reduced pressure of up to 0.9 bar, preferably of at least 0.2 bar).

The contacting step is preferably effected at an adhesive temperature of 50° C. or more, in particular a temperature between 50 and 200° C., preferably between 100 and 150° C.

In the pressure lamination process, the molten hotmelt adhesive composition is applied either to the carrier and/or the surface of the foam or textile (S1) (decoration). The adhesive bonding of the carrier to the decoration is effected if need be under the influence of heat with joining and pressing.

Examples

TABLE 1

Characterization of the raw materials used and the designation thereof

| P1 | Silane-grafted poly-α-olefin, molecular weight (Mn): 10 600 g/mol, melt viscosity (190° C., DIN 53019): 5000 mPa · s, softening temperature (ring-and-ball): 98° C. |
| P2 | Silane-grafted poly(propylene/ethylene) (poly-α-olefin) (obtained by metallocene catalysis), melt viscosity (170° C., DIN 53018): about 100 mPa · s, softening temperature (ring-and-ball): 100° C., dropping point: about 80° C., density: about 0.90 g/cm³, silane content: about 10% by weight (grafting agent: vinyltriethoxysilane) |

Adhesive compositions were prepared by mixing the ingredients according to the parts by weight stated in Table 2 with one another at a temperature of 150° C. and under an inert atmosphere in a stirred apparatus.

Viscosity

After the melting of the respective hotmelt adhesive in a closed tube for 20 minutes at 140° C. in an oven, 9.7 g of adhesive were weighed into a disposable sleeve and thermostated for 20 minutes in a viscometer at the respective temperature stated in Table 2. The measurement of the viscosity was effected at 130° C. or 190° C., at 10 revolutions per minute on a Brookfield DV-2 Thermosel viscometer using spindle No. 27. The value which results after measurement for 5 minutes is chosen as the viscosity. In Table 2, the measured value at 130° C. is stated as "$Visc_{130}$" and that at 190° C. is stated as "$Visc_{190}$".

Build-Up of Early Strength

The hotmelt adhesive was melted and was applied at an adhesive temperature of 140° C. to PP test specimens (100 mm×25 mm×5 mm) and joined to a second PP test specimen (adhesive thickness: 1 mm, overlap area: 25 mm×25 mm). The early strength was measured by measurement of these shear tensile strength test specimens after different times ($t_x$), measured from application of the molten adhesive, by means of a Zwick Z020 tensile tester at a measuring speed of 10 mm/min at 23° C. and 50% relative humidity. The measured maximum tensions ("$\sigma_{max}$") after the time $t_x$ are stated in Table 2. For practical reasons, no measurements could be carried out below 3 minutes ($t_x$) by this method.

Figure 2:
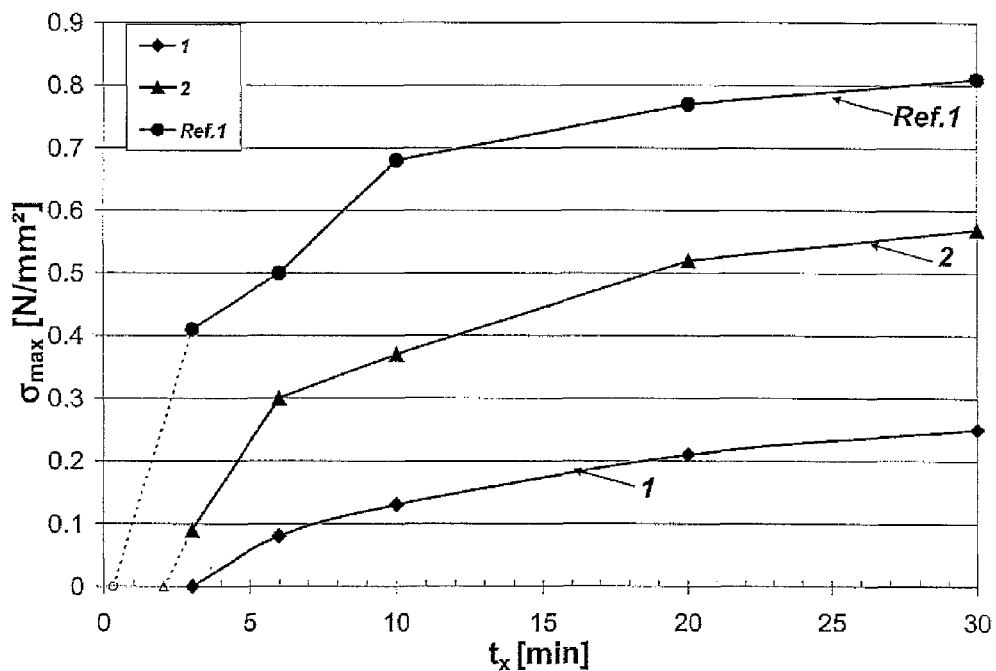
FIG. 2 is a graph depicting the early strength development curves as maximum tension ($\sigma_{max}$) versus time after application of the adhesive ($t_x$) of Examples 1 and 2 and Comparative Example Ref. 1.

FIG. 2 shows the early strength development curves as maximum tension ($\sigma_{max}$) versus time after application of the adhesive ($t_x$) of Examples 1 and 2 and the Comparative Example Ref. 1. The parts of the curves which are dashed and the points under 3 minutes have been extrapolated from the existing curve.

Open Time

The hotmelt adhesive was melted at 140° C. and about 20 g was applied by means of a knife coater in a layer thickness of 500 μm and a width of 60 mm to the siliconized side of a siliconized paper (B700 white, Laufenberg & Sohn, Germany) lying on a hot plate at the temperature of 150° C., as a strip of about 30 cm. Immediately after the adhesive application, the paper thus coated was placed on a beech wood plate conditioned at 23° C. After regular time intervals ("$t_y$") of 30 seconds, a strip (10 cm×1 cm) of the siliconized paper was then placed with the paper side on the adhesive, pressed on briefly with the finger and slowly peeled off again. The end of the open time was determined as that time, measured from the time of adhesive application, when the adhesive no longer remains adhering to the top paper.

Softening Point

The softening point was measured by the ring-and-ball method, according to DIN EN 1238.

TABLE 2

| Hotmelt adhesive compositions | | | |
|---|---|---|---|
|  | 1 | 2 | Ref. 1 |
| P1 | 65.0 | 65.0 | 65.0 |
| P2 | 10.0 | 10.0 | 10.0 |
| Wingtack ® 10 (softening point: 10° C.) | 25.0 | 0 | 0 |
| Sylvatac ® RE 12 (softening point: 10° C.) | 0 | 25.0 | 0 |
| Dibutyltin dilaurate | 0.05 | 0.05 | 0.05 |
| Open time [min] | 3 | 2 | 0.5 |
| Softening point [° C.] | 88 | 92 | 94 |
| $Visc_{130}$ [Pas] | 8.0 | 20.5 | 21.5 |
| $Visc_{190}$ [Pas] | 1.6 | 5.2 | 3.8 |
| $\sigma_{max}$ (3 min) [N/mm²] | 0.00 | 0.09 | 0.41 |
| $\sigma_{max}$ (6 min) [N/mm²] | 0.08 | 0.30 | 0.50 |
| $\sigma_{max}$ (10 min) [N/mm²] | 0.13 | 0.37 | 0.68 |
| $\sigma_{max}$ (20 min) [N/mm²] | 0.21 | 0.52 | 0.77 |
| $\sigma_{max}$ (30 min) [N/mm²] | 0.25 | 0.57 | 0.81 |

It is evident here from the results of Table 2 and of FIG. 2 that Examples 1 and 2 have a significantly longer open time than the corresponding Comparative Example Ref. 1. The examples show a rapid build-up of strength. All adhesives have in addition a comparable final strength after their crosslinking.

The invention claimed is:

1. A hotmelt adhesive composition comprising:
   a) at least two different thermoplastic, silane-grafted poly-α-olefins (P) that are each solid at 25° C.; and
   b) at least one soft resin (WH) having a melting point or softening point between −10° C. and 40° C.;
   wherein:
      the proportion of all silane-grafted poly-α-olefins (P) present in the hotmelt adhesive composition is greater than 50% by weight of the hotmelt adhesive composition;
      the weight ratio of all soft resins (WH) to all silane-grafted poly-α-olefins (P) is between 0.2 and 0.4; and
      the total weight of all thermoplastic, silane-grafted poly-α-olefins (P) which are solid at 25° C., all soft resins (WH), and all optionally present solid thermoplastic poly-α-olefins (P') is more than 80% by weight of the hotmelt adhesive composition.

2. The hotmelt adhesive composition according to claim 1, wherein the silane-grafted poly-α-olefin (P) has a softening temperature between 70° C. and 150° C.

3. The hotmelt adhesive composition according to claim 1, wherein the silane-grafted poly-α-olefin (P) is a silane-grafted polyethylene or polypropylene.

4. The hotmelt adhesive composition according to claim 1, wherein the silane-grafted poly-α-olefin (P) is a poly-α-olefin which was prepared by use of metallocene catalysts and onto which silane groups were grafted.

5. The hotmelt adhesive composition according to claim 1, further comprising a thermoplastic poly-α-olefin (P') which is solid at room temperature.

6. The hotmelt adhesive composition according to claim 1, wherein the at least one soft resin (WH) has a melting point or softening point between 0° C. and 25° C.

7. The hotmelt adhesive composition according to claim 1, wherein the at least one soft resin (WH) is a hydrocarbon resin.

8. The hotmelt adhesive composition according to claim 1, wherein an amount of all soft resins (WH) is at least 20% by weight of the hotmelt adhesive composition, and the weight ratio of all soft resins (WH) to all silane-grafted poly-α-olefins (P) is between 0.2 and 0.4.

9. The hotmelt adhesive composition according to claim 1, wherein the total weight of all thermoplastic, silane-grafted poly-α-olefins (P) which are solid at 25° C., all soft resins (WH), and all optionally present solid thermoplastic poly-α-olefins (P') is more than 90% by weight of the hotmelt adhesive composition.

10. A method comprising:
    adhesive bonding of polyolefin films or foams or textiles using the hotmelt adhesive composition of claim 1.

11. A method comprising: laminating adhesive bonding of polyolefin films or foams or textiles using the hotmelt adhesive composition of claim 1.

12. A composite body comprising:
    a first substrate (S1), which is a polyolefin film or a foam or a textile;
    the hotmelt adhesive composition according to claim 1, and
    a second substrate (S2);
    the hotmelt adhesive composition being arranged between the first substrate (S1) and the second substrate (S2).

13. The composite body according to claim 12, wherein the second substrate (S2) is a fibre material.

14. The composite body according to claim 12, wherein the second substrate (S2) is a polypropylene.

15. A process for producing a composite body according to claim 12, comprising:
    (i) melting the hotmelt adhesive composition of claim 1;
    (ii) applying the molten hotmelt adhesive composition to a polyolefin film (S1);
    (iii) heating the polyolefin film; and
    (iv) bringing the second substrate (S2) into contact with the molten hotmelt adhesive composition.

16. The process according to claim 15, wherein the contacting step is effected under a pressure.

* * * * *